United States Patent
Hara et al.

(10) Patent No.: US 7,229,947 B2
(45) Date of Patent: *Jun. 12, 2007

(54) CATALYST FOR HYDROGEN GENERATION AND CATALYST FOR PURIFYING OF EXHAUST GAS

(75) Inventors: Naoyuki Hara, Toyota (JP); Ichiro Hachisuka, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 225 days.

This patent is subject to a terminal disclaimer.

(21) Appl. No.: 10/468,417

(22) PCT Filed: Feb. 4, 2002

(86) PCT No.: PCT/JP02/00901

§ 371 (c)(1),
(2), (4) Date: Nov. 3, 2003

(87) PCT Pub. No.: WO02/066153

PCT Pub. Date: Aug. 29, 2002

(65) Prior Publication Data

US 2004/0157733 A1 Aug. 12, 2004

(30) Foreign Application Priority Data

| Feb. 19, 2001 | (JP) | ............................. 2001-041714 |
| Apr. 3, 2001 | (JP) | ............................. 2001-104322 |
| Aug. 8, 2001 | (JP) | ............................. 2001-240616 |

(51) Int. Cl.
*B01J 23/00* (2006.01)

(52) U.S. Cl. ..................... 502/327; 502/332; 502/333; 502/334; 502/339; 502/349; 502/350; 502/351; 502/355; 502/415; 502/439

(58) Field of Classification Search ................ 502/327, 502/332–334, 339, 349–351, 355, 415, 439
See application file for complete search history.

(56) References Cited

U.S. PATENT DOCUMENTS

| 5,597,771 | A | * | 1/1997 | Hu et al. ..................... 502/304 |
| 5,804,152 | A | | 9/1998 | Miyoshi et al. |
| 6,025,297 | A | | 2/2000 | Ogura et al. |
| 6,159,897 | A | | 12/2000 | Suzuki et al. |
| 6,165,429 | A | | 12/2000 | Ikeda et al. |
| 6,261,989 | B1 | * | 7/2001 | Tanaka et al. ............... 502/217 |
| 6,335,305 | B1 | * | 1/2002 | Suzuki et al. ................ 502/325 |

(Continued)

FOREIGN PATENT DOCUMENTS

EP 0 657 204 A1 6/1995

(Continued)

*Primary Examiner*—Cam N. Nguyen
(74) *Attorney, Agent, or Firm*—Oliff & Berridge, PLC

(57) ABSTRACT

An $NO_x$ sorption-and-reduction type catalyst is made which includes a hydrogen generating catalyst in which Rh is loaded on a support including an $Al_2O_3$—$ZrO_2$ composite oxide. Since the $Al_2O_3$—$ZrO_2$ composite oxide exhibits a basicity lower than $ZrO_2$, $SO_x$ are less likely to approach so that it is possible to suppress the sulfur poisoning of Rh. Moreover, the $Al_2O_3$—$ZrO_2$ composite oxide exhibits higher heat resistance than $ZrO_2$, and it has a function of improving the steam reforming reaction activity of Rh in the same manner as $ZrO_2$. Therefore, the post-durability $NO_x$ purifying ability of the $NO_x$ sorption-and-reduction type catalyst is improved.

14 Claims, 3 Drawing Sheets

U.S. PATENT DOCUMENTS

| | | | |
|---|---|---|---|
| 6,391,276 B1 * | 5/2002 | Suda et al. | 423/598 |
| 6,426,316 B2 * | 7/2002 | Tanaka et al. | 502/340 |
| 6,440,378 B1 * | 8/2002 | Hirata et al. | 423/239.1 |
| 6,500,392 B2 * | 12/2002 | Mizuno et al. | 422/177 |
| 6,537,511 B1 * | 3/2003 | Chattha et al. | 423/213.5 |
| 6,649,133 B1 * | 11/2003 | Hasegawa et al. | 423/239.1 |
| 6,806,225 B1 | 10/2004 | Ikeda et al. | |
| 6,841,511 B2 * | 1/2005 | Kaneeda et al. | 502/330 |
| 6,852,665 B2 | 2/2005 | Morikawa et al. | |
| 6,926,875 B2 * | 8/2005 | Hatanaka et al. | 423/239.1 |

FOREIGN PATENT DOCUMENTS

| | | |
|---|---|---|
| EP | 0 707 882 A1 | 4/1996 |
| EP | 0 852 966 A1 | 7/1998 |
| EP | 0 992 276 A1 | 4/2000 |
| EP | 0 993 860 A1 | 4/2000 |
| EP | 1 036 767 A1 | 9/2000 |
| EP | 1 175 935 A2 | 1/2002 |
| JP | A 5-168860 | 7/1993 |
| JP | A 5-168924 | 7/1993 |
| JP | A 5-195755 | 8/1993 |
| JP | A 5-317625 | 12/1993 |
| JP | A 5-317652 | 12/1993 |
| JP | A 6-31139 | 2/1994 |
| JP | A 8-99034 | 4/1996 |
| JP | A 8-117602 | 5/1996 |
| JP | A 9-926 | 1/1997 |
| JP | A 9-24247 | 1/1997 |
| JP | A 9-24274 | 1/1997 |
| JP | A 9-192487 | 7/1997 |
| JP | A 10-356 | 1/1998 |
| JP | 10-258232 | 9/1998 |
| JP | 11-076838 | 3/1999 |
| JP | 11-138021 | 5/1999 |
| JP | A 11-197503 | 7/1999 |
| JP | A 11-262666 | 9/1999 |
| JP | A 2000-189798 | 7/2000 |
| JP | A 2001-9279 | 1/2001 |
| JP | 2002-331238 | 11/2002 |

* cited by examiner

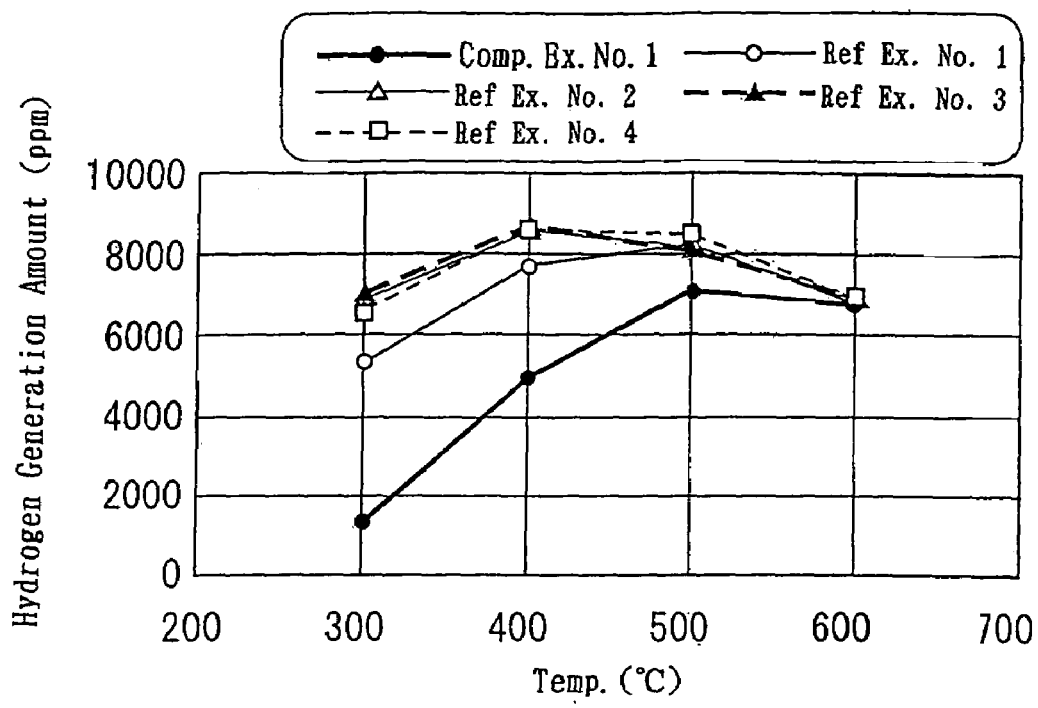
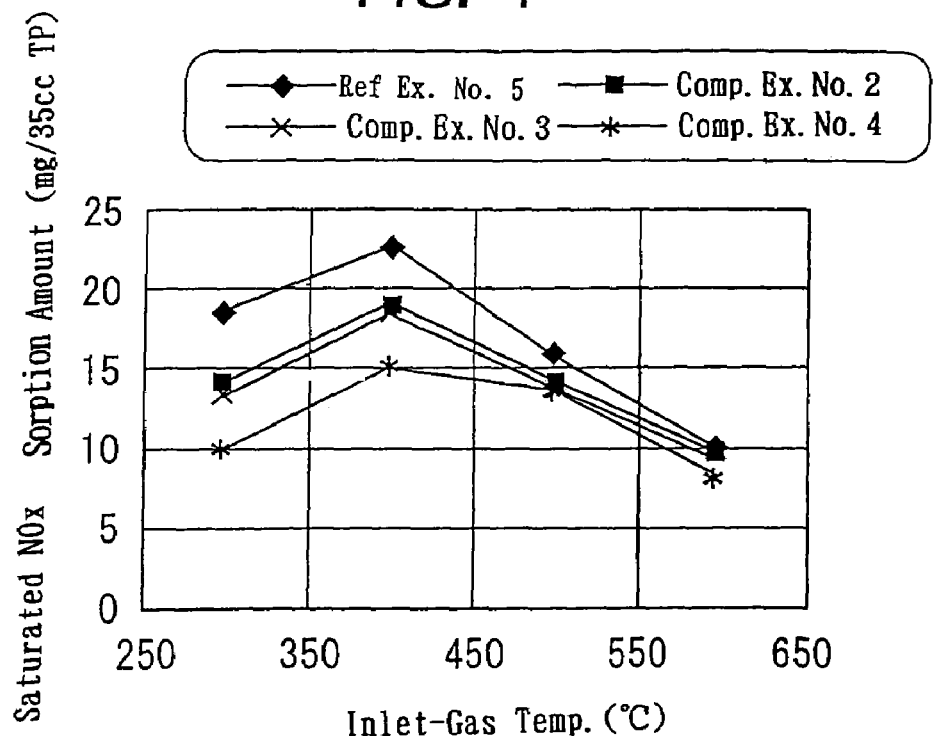

CATALYST FOR HYDROGEN GENERATION AND CATALYST FOR PURIFYING OF EXHAUST GAS

TECHNICAL FIELD

The present invention relates to a hydrogen generating catalyst which generates hydrogen out of hydrocarbons in an exhaust gas which is put in a rich atmosphere in short of oxygen, and an $NO_x$ sorption-and-reduction type catalyst for purifying an exhaust gas which utilizes this hydrogen generating catalyst.

BACKGROUND ART

Recently, as a catalyst for purifying $NO_x$ in an exhaust gas of an oxygen-excessive lean atmosphere, an $NO_x$ sorption-and-reduction type catalyst has been utilized. This $NO_x$ sorption-and-reduction type catalyst, for example, as disclosed in Japanese Unexamined Patent Publication (KOKAI) No. 5-317,625, is one in which a noble metal, such as Pt and Rh, and an $NO_x$ sorption member, such as K and Ba, are loaded on a porous support, such as $Al_2O_3$. By using this $NO_x$ sorption-and-reduction type catalyst and controlling an air-fuel ratio from a lean side to a stoichiometric as well as rich side in a pulsating manner (rich spiking), since an exhaust gas, too, becomes from a lean atmosphere to a stoichiometric as well as rich atmosphere, $NO_x$ are sorbed in the $NO_x$ sorption member on the lean side, and they are released on the stoichiometric or rich side to react with reductive components, such as HC and CO, so that they are purified. Therefore, even when it is an exhaust gas from a lean burn engine, it is possible to purify $NO_x$ with good efficiency. Moreover, since HC and CO in the exhaust gas are oxidized by the noble metal and, at the same time, are consumed in the reduction of $NO_x$, HC as well as Co are also purified with good efficiency.

For example, in Japanese Unexamined Patent Publication (KOKAI) No. 5-317,652, a catalyst for purifying an exhaust gas is proposed in which an alkaline-earth metal, such as Ba, and Pt are loaded on a porous oxide support, such as $Al_2O_3$. Further, in Japanese Unexamined Patent Publication (KOKAI) No. 6-31,139, a catalyst for purifying an exhaust gas is proposed in which an alkali metal, such as K, and Pt are loaded on a porous oxide support, such as $Al_2O_3$. Furthermore, in Japanese Unexamined Patent Publication (KOKAI) No. 5-168,860, a catalyst for purifying an exhaust gas is proposed in which a rare-earth element, such as La, and Pt are loaded on a porous oxide support, such as $Al_2O_3$.

It has been found out that the purifying reaction of $NO_x$ in the $NO_x$ sorption-and-reduction type catalyst comprises a first step, in which NO in an exhaust gas is oxidized to make it into $NO_x$, a second step, in which $NO_x$ are sorbed onto an $NO_x$ sorption member, and a third step, in which $NO_x$ released from the $NO_x$ sorption member are reduced on the catalyst.

However, in the conventional $NO_x$ sorption-and-reduction type catalyst, the granular growth of Pt occurs in a lean atmosphere, there is a problem in that the reactivities of the aforementioned first step and second step are lowered by the decrement in the catalytic active sites.

While, as a catalytic noble metal which is less likely cause such a granular growth in a lean atmosphere, Rh has been known, however, the oxidizing ability does not come up to Pt. Hence, it is thought of using Pt and Rh together.

However, when Pt and Rh are used together, there is a drawback in that the oxidizing ability of Pt lowers. Accordingly, as the addition amount of Rh increases, the reactivity of the first step, in which NO is oxidized to make it into $NO_x$, lowers so that the sorbing ability of $NO_x$ in the second step lowers as well. Moreover, Rh is poor in terms of the compatibility to an $NO_x$ sorption member, and there is a problem in that, when Rh and an $NO_x$ sorption member coexist, the characteristics of the $NO_x$ sorption ability and Rh cannot be fully exhibited.

Moreover, in an exhaust gas, $SO_2$, which is generated by burning sulfur (S) contained in a fuel, is included, and it is oxidized by a noble metal in an exhaust gas of a lean atmosphere so that it is turned into $SO_3$. Then, it has become apparent that it is readily turned into sulfuric acid by water vapor, which is also contained in the exhaust gas, that these react with the $NO_x$ sorption member to generate sulfites and sulfates, and that the $NO_x$ sorption member is thereby poisoned to degrade. This is referred to as the sulfur poisoning of the $NO_x$ sorption member. In addition, since the porous oxide support, such as $Al_2O_3$, has a property that it is likely to adsorb $SO_x$, there is a problem in that the aforementioned sulfur poisoning has been facilitated. Then, when the $NO_x$ sorption member is thus turned into sulfites and sulfates so that it is poisoned to degrade, it can no longer sorb $NO_x$, as a result, there is a drawback in that the $NO_x$ purifying performance lowers after a high-temperature durability test (hereinafter, referred to as "post-durability").

Hence, in Japanese Unexamined Patent Publication (KOKAI) No. 10-356, there is disclosed an $NO_x$ sorption-and-reduction type catalyst which is made by intermingling a first powder, in which Rh is loaded on $Al_2O_3$ or $ZrO_2$, and a second powder, in which an $NO_x$ sorption member and Pt are loaded on $Al_2O_3$. In accordance with this $NO_x$ sorption-and-reduction type catalyst, since Rh and Pt are loaded separately, the oxidizing ability of Pt is inhibited from lowering. Moreover, since Rh and the $NO_x$ sorption member are loaded separately, the poorness in the mutual compatibility is not revealed so that the characteristics of the $NO_x$ sorption member and Rh are fully exhibited.

Moreover, in accordance with $ZrO_2$ with Rh loaded (hereinafter referred to as an "$Rh/ZrO_2$ catalyst"), hydrogen having a high reducing power is formed out of HC and $H_2O$ in an exhaust gas (a steam reforming reaction), and this hydrogen contributes to the reduction of $NO_x$ and the elimination of $SO_x$ from sulfates of the $NO_x$ sorption member. Thus, the $NO_x$ reduction ability in rich spiking becomes high, and the sulfur poisoning becomes remarkably less.

However, compared with $Al_2O_3$ which is often used as a support for noble metals, $ZrO_2$ exhibits lower heat resistance, the specific surface area is decreased by the heat in service, and thereby there is a drawback in that the dispersibility of Rh lowers so that the hydrogen generating ability lowers. Moreover, since $ZrO_2$ is a basic support, $SO_x$ in an exhaust gas are likely to approach, and accordingly a phenomenon arises in which the hydrogen generating ability is lowered by the sulfur poisoning of loaded Rh.

Accordingly, in an $NO_x$ sorption-and-reduction type catalyst including an $Rh/ZrO_2$ catalyst, there is a problem in that the post-durability $NO_x$ purifying ability is lowered by the lowering of the hydrogen generating ability of the $Rh/ZrO_2$ catalyst.

Moreover, it has been understood that another cause, by which the post-durability $NO_x$ purifying ability is lowered, lies in that a reaction occurs between cordierite, which has been used as a support substrate in general, and an alkali component, which works as the $NO_x$ sorption member, and thereby the $NO_x$ sorption ability has been lowered.

Namely, the alkali component is likely to move in a coating layer, such as $Al_2O_3$, and simultaneously exhibits a high reactivity to Si. Accordingly, it is believed that the alkali component moves in the coating layer when the temperature is high, arrives at the support substrate and reacts with Si in cordierite to form silicate, being a composite oxide. Since this silicate is a stable compound, the alkali component, which has been turned into silicate, no longer has an ability of sorbing $NO_x$, and accordingly the $NO_x$ purifying performance has been lowered.

Hence, in Japanese Unexamined Patent Publication (KO-KAI) No. 8-117,602, an $NO_x$ sorption-and-reduction type catalyst is proposed in which a Ti—Zr composite oxide, an $NO_x$ sorption member and a noble metal are loaded on an $Al_2O_3$ support.

By thus making a composite support in which a Ti—Zr composite oxide is loaded on $Al_2O_3$, it is possible to highly maintain the initial $NO_x$ purifying rate due to the advantage of $Al_2O_3$. Moreover, by loading a Ti—Zr composite oxide, it is possible to raise the acidity of the support itself. Therefore, since this composite support, compared with the case where $Al_2O_3$ is used alone, is less likely to adsorb $SO_x$, and since adsorbed $SO_x$ are likely to eliminate at a low temperature, the contacting probability between the $NO_x$ sorption member and $SO_x$ is lowered In addition, in a support in which a Ti—Zr composite oxide is loaded, it is believed that the movement of alkali component is suppressed, and it has been understood that the reaction of the alkali component to $TiO_2$ is suppressed. Therefore, when the aforementioned composite support is used, a high $NO_x$ purifying rate is secured even in the initial period, since the sulfur poisoning as well as the solving of the alkali metal into the support are suppressed, a post-durability $NO_x$ purifying rate is improved.

However, in a catalyst in which a Ti—Zr composite oxide is loaded on an $Al_2O_3$ support, compared with a composite support comprising $TiO_2$—$Al_2O_3$ as disclosed in Japanese Unexamined Patent Publication (KOKAI) No. 8-099,034 or a catalyst which uses a support in which $TiO_2$ is added to $Al_2O_3$, it is not possible to say that the suppression effect of the sulfur poisoning is sufficient, and accordingly it has been required to further suppress the sulfur poisoning and improve the $NO_x$ purifying rate.

Moreover, due to the recent improvement of engine performance, the increase of high speed driving, and the like, the temperature of exhaust gas has risen so that the improvement of $NO_x$ purifying activity in a high temperature region has become an assignment. This is because, in a high temperature region, $NO_x$, which have been sorbed in an $NO_x$ sorption member, are likely to be released, and the $NO_x$ sorption amount is likely to be insufficient in a lean atmosphere. Hence, K, which exhibits a high basicity and is stable at a high temperature, is made into an $NO_x$ sorption member, but, in a catalyst in which K is loaded on $Al_2O_3$, and so on, there has been a problem in that the $NO_x$ sorption ability in a high temperature region is not improved so much.

Hence, it was thought of using a support which exhibits a higher basicity, and, in Japanese Unexamined Patent Publication (KOKAI) No. 5-195,755, a catalyst is disclosed in which K and a noble metal are loaded on $ZrO_2$. In accordance with this catalyst, since the basicities of the support and $NO_x$ sorption member are high, it is likely to sorb but less likely to release $NO_x$. Therefore, the $NO_x$ sorption ability in a high temperature region is improved, as a result, the $NO_x$ purifying performance in a high temperature region is improved.

However, in the catalyst in which K and a noble metal are loaded on $ZrO_2$, since the basicity of the support is high, there has been a drawback in that it is likely to sorb not only $NO_x$ but also $SO_x$ so that the lowering of the activity by the sulfur poisoning is considerable. Namely, when the basicity of a support is high, although the $NO_x$ sorption ability is improved, even the sulfur poisoning is facilitated. On the contrary, when the basicity of a support is low, although the sulfur poisoning is suppressed, even the $NO_x$ sorption ability is lowered.

The present invention has been done in view of such circumstances, it is a main object to improve the heat resistance and sulfur-poisoning resistance of an $Rh/ZrO_2$ catalyst, being a hydrogen generating catalyst, and, being accompanied therewith, to improve the post-durability $NO_x$ purifying ability of an $NO_x$ sorption-and-reduction type catalyst.

Moreover, the second object of the present invention is to further suppress the sulfur poisoning of an $NO_x$ sorption-and-reduction type catalyst, thereby furthermore improving the high-temperature post-durability $NO_x$ purifying rate.

In addition, a further object of the present invention is to make a catalyst which can satisfy both of the contradictory phenomena, such as the improvement of the $NO_x$ sorption ability in a high temperature region and the suppression of the sulfur poisoning, and which is good in terms of the heat resistance.

The characteristic of a hydrogen generating catalyst, which solves the aforementioned assignments and is set forth in claim 1, lies in that Rh is loaded on a support comprising a $ZrO_2$—$Al_2O_3$ composite oxide including first composite particles having a structure comprising a core portion in which $ZrO_2$ is a major component and a superficial portion formed on a surface of the core portion and including $Al_2O_3$ more than the core portion.

$Al_2O_3$ can desirably be included in an amount of from 1 to 30% by mol in the $ZrO_2$—$Al_2O_3$ composite oxide.

Then, the characteristic of a catalyst for purifying an exhaust gas, of an $NO_x$ sorption-and-reduction type catalyst comprising a noble metal and an $NO_x$ sorption member loaded on a porous oxide support, which solves the aforementioned assignments and is set forth in claim 4, lies in that the hydrogen generating catalyst of the present invention is included. The porous oxide support can desirably include second composite particles having a structure comprising a core portion in which $ZrO_2$ is a major component and a superficial portion formed on a surface of the core portion and including an oxide, whose basicity is lower than $ZrO_2$, more than the core portion.

BRIEF DESCRIPTION OF DRAWINGS

FIG. 3 is a graph for illustrating the relationships between the temperatures and hydrogen generation amounts in the hydrogen generating catalysts of reference examples as well as a comparative example.

FIG. 4 is a graph for illustrating the relationships between the temperatures and saturated $NO_x$ sorption amounts in the $NO_x$ sorption-and-reduction type catalysts of a reference example as well as comparative examples.

BEST MODE FOR CARRYING OUT INVENTION

In the hydrogen generating catalyst of the present invention, Rh is loaded on a support comprising a $ZrO_2$—$Al_2O_3$ composite oxide. Since the $ZrO_2$—$Al_2O_3$ composite oxide exhibits a lower basicity than $ZrO_2$, $SO_x$ become less likely to approach so that it is possible to suppress the sulfur poisoning of Rh. Moreover, the $ZrO_2$—$Al_2O_3$ composite oxide exhibits higher heat resistance than $ZrO_2$. Then, similarly to $ZrO_2$, the $ZrO_2$—$Al_2O_3$ composite oxide has the function of improving the steam reforming reaction activity of Rh.

Therefore, in accordance with the hydrogen generating catalyst of the present invention in which Rh is loaded on a support comprising a $ZrO_2$—$Al_2O_3$ composite oxide, compared with an $Rh/ZrO_2$ catalyst, the heat resistance and sulfur-poisoning resistance are improved, and accordingly a high hydrogen generating ability is revealed even in post-durability.

Moreover, in accordance with the catalyst for purifying an exhaust gas of the present invention, sine the hydrogen generating catalyst of the present invention is included, it is good in terms of the hydrogen generating ability from initial period to post-durability, and thereby a high $NO_x$ purifying ability is revealed from initial period to post-durability.

In the hydrogen generating catalyst of the present invention, the $Al_2O_3$ amount in the $ZrO_2$—$Al_2O_3$ composite oxide can desirably be from 1 to 30% by mol. When $Al_2O_3$ is less than 1% by mol, the effect of the improvement of the heat resistance and sulfur-poisoning resistance cannot be obtained so that the post-durability hydrogen generating ability is lowered, when $Al_2O_3$ is more than 30% by mol, the hydrogen generating ability is lowered even from initial period.

The support comprising the $ZrO_2$—$Al_2O_3$ composite oxide include first composite particles, which have a structure comprising a core portion in which $ZrO_2$ is a major component and a superficial portion formed on a surface of the core portion and including $Al_2O_3$ more than the core portion. The first composite particles exhibit a high basicity at the inside by the core portion in which $ZrO_2$ is a major component, and exhibit a low basicity at the superficial portion by $Al_2O_3$ which exists more in the superficial portion. Consequently, it is believed $SO_x$ are inhibited from approaching, and accordingly the hydrogen generating catalyst of the present invention is improved in terms of the sulfur-poisoning resistance. Moreover, similarly to a $ZrO_2$—$Al_2O_3$ composite oxide having a uniform composition, it has the function of improving the steam reforming reaction activity of Rh.

Figure 1:
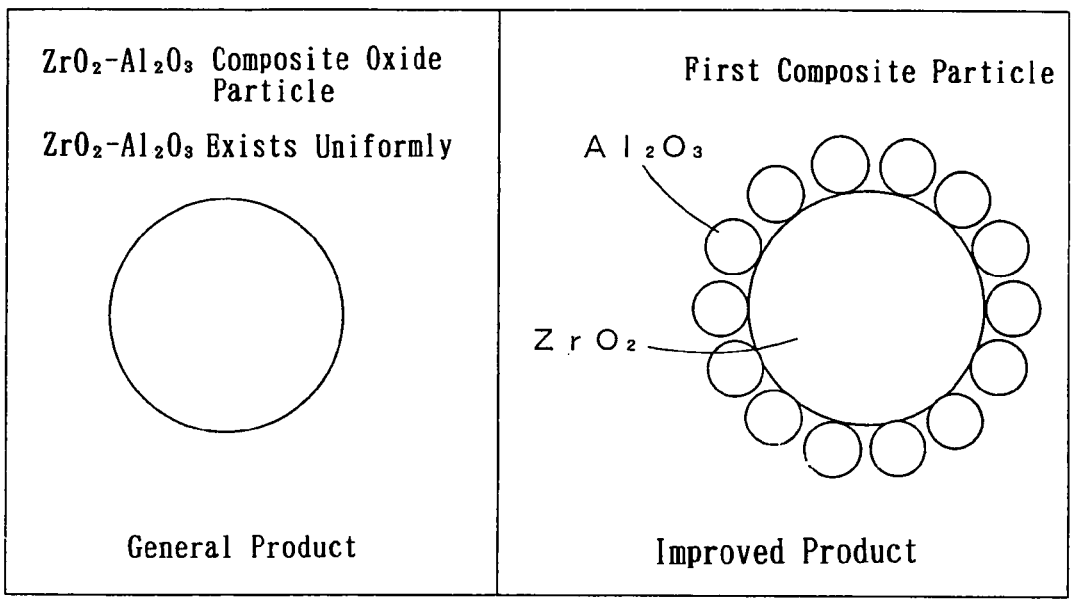
FIG. 1 is an explanatory diagram for schematically illustrating the structures of a general $ZrO_2$—$Al_2O_3$ composite oxide particle and a first composite particle which is its improved product.

A general $ZrO_2$—$Al_2O_3$ composite oxide particle, as illustrated as "General Product" in FIG. 1, is made into a uniform composition from the surface to the inside. However, the first composite particle which is used in the present invention, as illustrated as "Improved Product" in FIG. 1, is made into a structure comprising a core portion in which $ZrO_2$ is a major component and a superficial portion formed on a surface of the core portion and including $Al_2O_3$ more than the core portion. The $Al_2O_3$ in the superficial portion can be formed as a fine particle shape or a film shape, but $ZrO_2$ can desirably be exposed partially. Moreover, the $Al_2O_3$ in the superficial portion can desirably exist in a highly dispersed state.

Note that, although both of the particles illustrated in FIG. 1 are a $ZrO_2$—$Al_2O_3$ composite oxide each, in order to distinguish them, the composite oxide particle, whose structure comprises a core portion in which $ZrO_2$ is a major component and a superficial portion formed on a surface of the core portion and including $Al_2O_3$ more than the core portion, is referred to as a first composite particle, and the composite oxide particle, whose structure is uniform from the inside to the surface, is referred to as a $ZrO_2$—$Al_2O_3$ composite oxide particle. In order to manufacture the first composite particles, for instance, zirconia precursors are precipitated out of a zirconium salt aqueous solution by pH adjustment, and they are calcined to make a $ZrO_2$ powder. To a suspension, in which this $ZrO_2$ powder is mixed in water, an aluminum salt aqueous solution is added, and alumina precursors are precipitated on the surface of the $ZrO_2$ powder by further carrying out pH adjustment. Thereafter, by calcining the resulting deposits, it is possible to manufacture the first composite particles whose structure comprises a core portion in which $ZrO_2$ is a major component and a superficial portion formed on a surface of the core portion and including $Al_2O_3$ more than the core portion.

It is desirable to use the first composite particles, whose structure comprises a core portion in which $ZrO_2$ is a major component and a superficial portion formed on a surface of the core portion and including $Al_2O_3$ more than the core portion, having an average particle diameter of 10 μm or less. With such an arrangement, it is believed that, in the first composite particles in proximity with each other, the probability of contacting the $Al_2O_3$ with each other or the $ZrO_2$ with each other lowers, and it is believed that the different members become partition walls so that the sintering is suppressed. Accordingly, the heat resistance is improved, and it is possible to suppress the lowering of the post-durability specific surface area.

Moreover, similarly to an $Rh/ZrO_2$ catalyst, the loading amount of Rh in the hydrogen generating catalyst of the present invention can preferably be from 0.01 to 10% by weight, and is especially preferable to fall in a range of from 0.5 to 2% by weight. When the loading amount of Rh is less than 0.01% by weight, the hydrogen generating ability is not revealed, and, when it is loaded in an amount of more than 10% by weight, not only the hydrogen generating ability saturates but also the costs go up.

Then, the catalyst for purifying an exhaust gas of the present invention, in an $NO_x$ sorption-and-reduction type catalyst in which a noble metal and an $NO_x$ sorption member are loaded on a porous oxide support, includes the hydrogen generating catalyst of the present invention. Since, compared with an $Rh/ZrO_2$ catalyst, the hydrogen generating catalyst of the present invention is improved in terms of the heat resistance and sulfur-poisoning resistance, a high hydrogen generating ability is revealed even in post-durability, and the catalyst for purifying an exhaust gas of the present invention is good in terms of the post-durability $NO_x$ purifying ability. Moreover, in the catalyst for purifying an exhaust gas of the present invention, Pt and Rh can be loaded separately so that it is possible to suppress the lowering in the oxidizing ability of Pt due to Rh. In addition, since it is possible to separately load Rh and the $NO_x$ sorption member, the poorness in the mutual compatibility is not revealed, and accordingly the characteristics of the $NO_x$ sorption member and Rh are fully exhibited.

Concerning the content of the hydrogen generating catalyst in the catalyst for purifying an exhaust gas of the present invention, when it is included in a small amount, the $NO_x$ purifying ability is improved to that extent, however, it is preferable to make the upper limit 50% by weight. When the amount of the hydrogen generating catalyst is more than this, it is not preferable because the content of the $NO_x$ sorption-and-reduction type catalyst decreases relatively so that the $NO_x$ sorption ability lowers. Note that, in order to contain the hydrogen generating catalyst, although the hydrogen generating catalyst of the present invention can be loaded on a porous support oxide support along with a noble metal and an $NO_x$ sorption member, it is preferable to use a mixture powder of a powder of an $NO_x$ sorption-and-reduction type catalyst, which comprises a noble metal and an $NO_x$ sorption member loaded on a porous support, and a powder of the hydrogen generating catalyst of the present invention.

As a porous oxide support of the $NO_x$ sorption-and-reduction type catalyst, it is possible to use $Al_2O_3$, $TiO_2$, $SiO_2$ or $ZrO_2$, or an arbitrary composite oxide selected from them. For example, when a $ZrO_2$—$Al_2O_3$ composite oxide is used as the porous oxide support, and when an alkali metal, such as K, is loaded as the $NO_x$ sorption member, it is especially preferred because it is not only good in terms of the $NO_x$ sorption ability in a high temperature region but also the sulfur-poisoning resistance is improved. Namely, since a $ZrO_2$—$Al_2O_3$ composite oxide exhibits a lower basicity than $ZrO_2$, it is possible to suppress the sulfur poisoning of $NO_x$ sorption member. Moreover, in this case, since it is possible to use the same support as the hydrogen generating catalyst, it is possible to reduce the number of raw materials, and accordingly it is possible to reduce the man-hour requirements for manufacturing.

The porous oxide support of the $NO_x$ sorption-and-reduction type catalyst can desirably include second composite particles having a structure comprising a core portion in which $ZrO_2$ is a major component and a superficial portion formed on a surface of the core portion and including an oxide, whose basicity is lower than $ZrO_2$, more than the core portion. With such an arrangement, since the basicity of the superficial portion is low, $SO_x$ are less likely to approach so that the sulfur poisoning of $NO_x$ sorption member is further suppressed. As an oxide whose basicity is lower than $ZrO_2$, $Al_2O_3$, $TiO_2$, $SiO_2$, and the like, are exemplified. For example, in second composite particles having a structure comprising a core portion in which $ZrO_2$ is a major component and a superficial portion formed on a surface of the core portion and including $Al_2O_3$ more than the core portion, the basicity of the inside is high because of the core portion in which $ZrO_2$ is a major component, and the basicity of the superficial portion is low because of $Al_2O_3$ which exists more on the surface of the core portion than the core portion. Accordingly, not only the sulfur-poisoning resistance is improved, but also the $NO_x$ sorption ability in a high temperature region is improved though the reason is not clear.

The second composite particles, which have a structure comprising a core portion in which $ZrO_2$ is a major component and a superficial portion formed on a surface of the core portion and including $Al_2O_3$ more than the core portion, are the ones similar to the above-described first composite particles, and accordingly it is possible to manufacture in the same manner as the above-described first composite particles. It is preferred that a composition of the second composite particles can fall in a range of $Al_2O_3/ZrO_2=3/97–15/85$ by molar ratio for the entire particles. When the $ZrO_2$ is less than this range, the $NO_x$ sorption ability in a high temperature region lowers, when the $ZrO_2$ is more than this range, the sulfur-poisoning resistance and heat resistance lower.

Moreover, it is desirable to use the second composite particles, whose structure comprising a core portion in which $ZrO_2$ is a major component and a superficial portion formed on a surface of the core portion and including $Al_2O_3$ more than the core portion, having an average particle diameter of 10 µm or less. With such an arrangement, it is believed that, in the second composite particles in proximity with each other, the probability of contacting the $Al_2O_3$ with each other or the $ZrO_2$ with each other lowers, and it is believed that the different members become partition walls so that the sintering is suppressed. Accordingly, the heat resistance is improved, and it is possible to suppress the lowering of the post-durability specific surface area.

By the way, in an $NO_x$ sorption-and-reduction type catalyst which uses a support in which a Ti—Zr composite oxide is loaded on an $Al_2O_3$ support, the cause that the action of suppressing the sulfur poisoning is not improved so much as expected is believed to lie in that, since the Ti and Zr are dispersed uniformly in the Ti—Zr composite oxide, the inside $TiO_2$ does not function effectively.

Hence, as the oxide whose basicity is lower than $ZrO_2$, it is also preferable to select $TiO_2$, and to use second composite particles whose structure comprises a core portion in which $ZrO_2$ is a major component and a superficial portion formed on a surface of the core portion and including $TiO_2$ more than the core portion. In the second composite particles, since the $TiO_2$ is included more in the surface, the utility efficiency of $TiO_2$ is improved. Then, since $TiO_2$ has less basic sites so that $SO_x$ are less likely to adsorb thereto, or so that adsorbed $SO_x$ are likely to eliminate therefrom, all in all, the adsorption amount of $SO_x$ is reduced. Moreover, due to the reasons that the contacting interface between the $NO_x$ sorption member and $TiO_2$ increases, and that composite oxide precursors, which are likely to decompose, are thereby formed, adsorbed $SO_x$ are eliminated with ease. By these actions, the suppression action of sulfur poisoning is improved. In addition, in the second composite particles, similarly to a Ti—Zr composite oxide, the movement of an alkali component is suppressed, and accordingly the reaction between the alkali component and $TiO_2$ is also suppressed.

Figure 2:
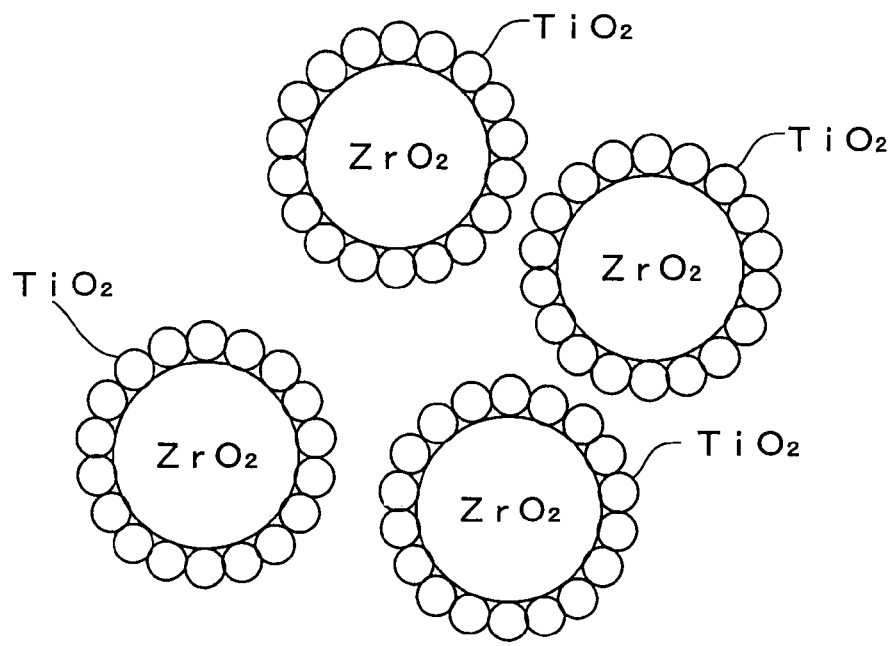
FIG. 2 is an explanatory diagram for schematically illustrating the structure of second composite particles which comprise a $ZrO_2$—$TiO_2$ composite oxide.

The second composite particles, whose structure comprises a core portion in which $ZrO_2$ is a major component and a superficial portion formed on a surface of the core portion and including $TiO_2$ more than the core portion, are formed as a dual structure as illustrated in FIG. 2. In the second composite particles, it is desirable to include $TiO_2$ in an amount of 30% by weight or more in the superficial portion. When the $TiO_2$ in the superficial portion is less than 30% by weight, the sulfur-poisoning-suppression action lowers. Note that, it has been found out that, even when the $TiO_2$ in the superficial portion is too much, the sulfur-poisoning-suppression effect lowers, and accordingly it is desirable to make the $TiO_2$ in the superficial portion less than 80% by weight.

Moreover, it is desired that the second composite particles, whose structure comprises a core portion in which $ZrO_2$ is a major component and a superficial portion formed on a surface of the core portion and including $TiO_2$ more than the core portion, can be particles having a particle diameter of 10 µm or less. When the particle diameter exceeds 10 μm, since the surface area of $TiO_2$, which contacts with sulfur components, becomes too small so that the sulfur-poisoning-suppression action lowers. Then, since the smaller the particle diameter is the higher the superficial-portion-occupying rate is, when the particle diameter is 10 μm or less, it is easy for the $TiO_2$ in the superficial portion to occupy 30% by weight or more. In addition, it is believed that, in the composite particles in proximity with each other, the probability of contacting the $TiO_2$ with each other or the $ZrO_2$ with each other lowers, and it is believed that the different members become partition walls so that the sintering is suppressed. Accordingly, the heat resistance is improved, and it is possible to suppress the lowering of the post-durability specific surface area.

In the second composite particles whose structure comprises a core portion in which $ZrO_2$ is a major component and a superficial portion formed on a surface of the core portion and including $TiO_2$ more than the core portion, it is desirable to further include $Al_2O_3$. By including $Al_2O_3$, the heat resistance is improved, and it is possible to suppress the lowering of the high-temperature post-durability specific surface area, at the same time, it is possible to suppress the granular growth of noble metal accompanied therewith, and the durability is improved. The $Al_2O_3$ can be included in at least one of the core portion and superficial portion, and is ordinarily included in both of the core portion and superficial portion.

It is desired that the $Al_2O_3$ can be included in an amount of 10% by mol or more. When it is less than 10% by mol, it is difficult to reveal the adding effect. Although the more the content of $Al_2O_3$ is the larger the high-temperature post-durability specific surface area is, since the amount of $TiO_2$ decreases relatively, it is preferable to make the amount of $Al_2O_3$ in a range of 50% by mol or less.

In order to manufacture the second composite particles whose structure comprises a core portion in which $ZrO_2$ is a major component and a superficial portion formed on a surface of the core portion and including $TiO_2$ more than the core portion, for instance, zirconia precursors are precipitated out of a zirconium salt aqueous solution by pH adjustment and they are calcined to make a $ZrO_2$ powder. To a suspension, in which this $ZrO_2$ powder is mixed in water, a titanium salt aqueous solution is added, and titania precursors are precipitated on the surface of the $ZrO_2$ powder by further carrying out pH adjustment. Thereafter, by calcining the resulting deposits, it is possible to manufacture the second composite oxide particles whose structure comprises a core portion in which $ZrO_2$ is a major component and a superficial portion formed on a surface of the core portion and including $TiO_2$ more than the core portion. Moreover, in order to further include $Al_2O_3$, an aluminum salt can be solved in one of the zirconium salt and titanium salt aqueous solutions or both of the aqueous solutions.

The catalyst for purifying an exhaust gas of the present invention can be formed as a shape, such as a pellet shape, a honeycomb shape or a foam shape, similarly to the conventional catalysts for purifying an exhaust gas. For example, in order to form it as a pellet shape, it can be molded into a pellet shape out of a mixture powder of a powder of an $NO_x$ sorption-and-reduction type catalyst and a powder of the hydrogen generating catalyst of the present invention. Moreover, it is possible to manufacture it by forming a coating layer on a support substrate out of a mixture powder in which a powder of an $NO_x$ sorption-and-reduction type catalyst and a powder of the hydrogen generating catalyst of the present invention are mixed. Alternatively, it is possible to manufacture it by forming a coating layer on a support substrate out of the aforementioned various porous oxide powders and loading the hydrogen generating catalyst, a noble metal and an $NO_x$ sorption member on the coating layer. In addition, a coating layer can be formed out of a porous oxide powder and a powder of the hydrogen generating catalyst, and a noble metal and an $NO_x$ sorption member can be loaded on the coating layer.

As the support substrate, it is possible to use one which is formed of heat resistant ceramics, such as cordierite, or a metal, and its shape can be selected from the group consisting of a honeycomb-shaped monolithic type, foam type, pellet type, and so on.

It is possible to form the coating layer by a general wash coating method. As a binder in this case, it is possible to use an alumina sol or a zirconia sol, and the like. Further, in the coating layer, it is desirable to include at least one optimum porous oxide powder selected from the group consisting of a $ZrO_2$—$Al_2O_3$ composite oxide powder including first composite particles having a structure comprising a core portion in which $ZrO_2$ is a major component and a superficial portion formed on a surface of the core portion and including $Al_2O_3$ more than the core portion, a powder comprising second composite particles which have a structure comprising a core portion in which $ZrO_2$ is a major component and a superficial portion formed on a surface of the core portion and including $Al_2O_3$ more than the core portion, a powder comprising second composite particles which have a structure comprising a core portion in which $ZrO_2$ is a major component and a superficial portion formed on a surface of the core portion and including $TiO_2$ more than the core portion, or a powder comprising particles further including $Al_2O_3$ in addition to the latter second composite particles. Furthermore, in addition to these, it can further include an arbitrary porous oxide powder, such as $Al_2O_3$, $SiO_2$, $ZrO_2$, $TiO_2$ and $CeO_2$. Moreover, it is possible to make an arrangement in which at least one powder selected from the group consisting of the aforementioned optimum porous oxide powders is loaded on a coating layer which comprises a porous oxide, such as $Al_2O_3$, $SiO_2$, $ZrO_2$, $TiO_2$ and $CeO_2$. In a case where an arbitrary porous oxide powder coexists, it is desirable to use the optimum porous oxide powders in an amount of 20% by weight or more at least. When the optimum porous oxide powders are less than this, it is difficult to reveal the effects of the improvement of the sulfur-poisoning resistance as well as the improvement of the $NO_x$ sorption ability in a high temperature region.

It is preferable to form the coating layer in a range of from 150 to 500 g with respect to 1 liter of a support substrate. When the forming amount of the coating layer is less than this, since the loading densities of the noble metal and $NO_x$ sorption member heighten, the durability of the purifying performance lowers, when it is formed more than this, such a drawback arises that the ventilation resistance enlarges.

As the noble metal loaded on the coating layer, it is possible to use one or more members of Pt, Rh, Pd, Ir or Ru. Moreover, as the $NO_x$ sorption member, it is possible to use at least one member selected from the group consisting of alkali metals, alkaline-earth metals and rare-earth elements. Among them, it is preferable to use at least one of alkali metals and alkaline-earth metals which exhibit a high alkalinity and a high $NO_x$ sorption ability.

As the alkali metal, Li, Na, K, Cs, and the like, are exemplified. The alkaline-earth metals refer to the 2A group elements in the periodic table of the elements, and Ba, Be, Mg, Ca, Sr, and so on, are exemplified. Moreover, as the rare-earth element, Sc, Y, La, Ce, Pr, Nd, Dy, Yb, and the like, are exemplified.

The loading amount of the noble metal on the coating layer, in the case of Pt and Pd, can preferably be from 0.1 to 10 g, especially preferably from 0.5 to 10 g, with respect to 1 liter of a support substrate. Further, in the case of Rh, it can preferably be from 0.01 to 10 g, especially preferably from 0.05 to 5 g. Furthermore, the loading amount of the $NO_x$ sorption member can desirably fall in a range of from 0.05 to 1.0 mol with respect to 1 liter of a support substrate. When the loading amount of the $NO_x$ sorption member is less than 0.05 mol/L, the $NO_x$ sorption ability lowers, when it is more than 1.0 mol/L, the sintering of noble metal is promoted.

A noble metal, excepting Rh, and an $NO_x$ sorption member can desirably be loaded on an optimum porous oxide powder which is selected from the group consisting of a $ZrO_2$—$Al_2O_3$ composite oxide powder including first composite particles having a structure comprising a core portion in which $ZrO_2$ is a major component and a superficial portion formed on a surface of the core portion and including $Al_2O_3$ more than the core portion, a powder comprising second composite particles which have a structure comprising a core portion in which $ZrO_2$ is a major component and a superficial portion formed on a surface of the core portion and including $Al_2O_3$ more than the core portion, a powder comprising second composite particles which have a structure comprising a core portion in which $ZrO_2$ is a major component and a superficial portion formed on a surface of the core portion and including $TiO_2$ more than the core portion, or a powder comprising particles further including $Al_2O_3$ in addition to the latter second composite particles. With such an arrangement, since Pt and Rh are inhibited from being loaded in proximity with each other, and since it is possible to inhibit Rh and an $NO_x$ sorption member from being loaded in proximity with each other, the purifying activity is further improved.

Then, by using the aforementioned catalyst for purifying an exhaust gas of the present invention, an oxygen-excessive-atmosphere exhaust gas, which has been burned at an air-fuel ratio (A/F) of about 18 or more, is contacted therewith so that $NO_x$, which are contained in the exhaust gas, are sorbed in the $NO_x$ sorption member, and the air-fuel ratio is fluctuated intermittently to be stoichiometric as well as oxygen-excessive so that $NO_x$, which have been released from the $NO_x$ sorption member, are reduced and purified. In an oxygen-excessive atmosphere, NO, which is contained in an exhaust gas, is oxidized on the catalyst to be turned into $NO_x$, and it is sorbed in the $NO_x$ sorption member. Then, when being put into a stoichiometric as well as oxygen-excessive atmosphere, $NO_x$ are released from the $NO_x$ sorption member, and they react with HC and CO, which are contained in the exhaust gas, on the catalyst so that they are reduced.

Then, when at least one of the first composite particles and the second composite particles are included, $SO_x$ are less likely to be adsorbed so that the sulfur poisoning of the $NO_x$ sorption member is suppressed. Moreover, when the second composite particles, which have a structure comprising a core portion in which $ZrO_2$ is a major component and a superficial portion formed on a surface of the core portion and including $TiO_2$ more than the core portion, are included, due to such reasons that the interface between the $TiO_2$ and $NO_x$ sorption member enlarges, and that composite oxide precursors, which are likely to decompose, are thereby formed, it is believed that the elimination of adsorbed $SO_x$ becomes more readily, accordingly it is possible to fully suppress the sulfur poisoning of the $NO_x$ sorption member even in post-durability, and it is possible to fully suppress the lowering of the $NO_x$ purifying ability.

Namely, in accordance with the hydrogen generating catalyst of the present invention, not only since it exhibits a hydrogen generating ability equivalent to an $Rh/ZrO_2$ catalyst, but also it is good in terms of the heat resistance and sulfur-poisoning resistance, a high hydrogen generating ability is revealed even in post-durability.

Then, in accordance with the catalyst for purifying an exhaust gas of the present invention, since it includes the hydrogen generated catalyst of the present invention, not only it is possible to inhibit the sulfur poisoning of the $NO_x$ sorption member by generated hydrogen, but also it is possible to maintain the characteristics even in high-temperature post-durability. Moreover, when an $NO_x$ sorption-and-reduction type catalyst is used in which a $ZrO_2$—$Al_2O_3$ composite oxide including first composite particles having a structure comprising a core portion in which $ZrO_2$ is a major component and a superficial portion formed on a surface of the core portion and including $Al_2O_3$ more than the core portion is made into a support, since the sulfur poisoning is suppressed to a higher extent, the durability is improved so that it is possible to more stably purify $NO_x$. Then, when an $NO_x$ sorption-and-reduction type catalyst is used in which second composite particles are made into a support, the sulfur-poisoning resistance is further improved so that a much higher $NO_x$ purifying ability is revealed even in post-durability.

EXAMPLES

Hereinafter, the present invention will be described in detail with reference to examples and comparative examples.

Reference Example No. 1

With respect to a predetermined amount of a commercially available $ZrO_2$—$Al_2O_3$ solid-solution powder which included $Al_2O_3$ in an amount of 1% by mol, a rhodium nitrate aqueous solution, which had a predetermined concentration, was absorbed in a predetermined amount, was dried at 250° C. for 15 minutes, and was thereafter calcined at 500° C. for 30 minutes to load Rh. The loading amount of Rh was 1.0% by weight. The resulting catalyst was formed as a pellet shape of about 2 mm by an ordinary method, thereby preparing a pellet catalyst.

Reference Example No. 2

Except that a $ZrO_2$—$Al_2O_3$ solid-solution powder was used which included $Al_2O_3$ in an amount of 10% by mol, a pellet catalyst of Reference Example No. 2 was prepared in the same manner as Reference Example No. 1.

Reference Example No. 3

Except that a $ZrO_2$—$Al_2O_3$ solid-solution powder was used which included $Al_2O_3$ in an amount of 20% by mol, a pellet catalyst of Reference Example No. 3 was prepared in the same manner as Reference Example No. 1.

Reference Example No. 4

Except that a $ZrO_2$—$Al_2O_3$ solid-solution powder was used which included $Al_2O_3$ in an amount of 30% by mol, a pellet catalyst of Reference Example No. 4 was prepared in the same manner as Reference Example No. 1.

Comparative Example No. 1

Except that a $ZrO_2$ powder was used instead of the $ZrO_2$—$Al_2O_3$ solid-solution powder, a pellet catalyst of Comparative Example No. 1 was prepared in the same manner as Reference Example No. 1.

Testing and Evaluation

The respective catalysts of the reference examples and comparative example were put in an evaluating apparatus, and a durability test was carried out in which they were held at 550° C. for 3 hours in a fluctuating atmosphere in which the lean/rich model gases set forth in Table 1 were flowed for 4-minute rich model gas and for 1-minute lean gas. The total flow rate of the gases was 30 L/min.

TABLE 1

| | $H_2$ % | NO ppm | $C_3H_6$ ppmC | $CO_2$ % | CO % | $O_2$ % | $SO_2$ ppm | $N_2$ |
|---|---|---|---|---|---|---|---|---|
| Lean | none | 400 | 2500 | 9.5 | 0.1 | 7.0 | 100 | balance |
| Rich | 2.0 | 400 | 3200 | 12 | 6.0 | none | 100 | balance |

On the respective pellet catalysts after the durability test, the hydrogen generation amounts were measured at the respective temperatures, 300° C., 400° C., 500° C. and 600° C., by using a rich model gas set forth in Table 2. The results are illustrated in FIG. 3.

TABLE 2

| | $H_2$ % | NO ppm | $C_3H_6$ ppmC | $CO_2$ % | CO % | $O_2$ % | $SO_2$ ppm | $N_2$ |
|---|---|---|---|---|---|---|---|---|
| Rich | 10 | none | 3200 | none | none | none | none | balance |

From FIG. 3, it is seen that, compared with the catalyst of the comparative example, the catalysts of the respective reference examples exhibited greater hydrogen generation amounts in a low temperature range, and it is apparent that this resulted from the fact that the $ZrO_2$—$Al_2O_3$ solid-solution powders were used. Moreover, compared with the catalysts of Reference Example No. 2 and Reference Example No. 3, the catalysts of Reference Example No. 1 and Reference Example No. 4 exhibited lower hydrogen generation amounts, and accordingly it is understood that an optimum value exists between 1 to 30% by mol in the $Al_2O_3$ content in the $ZrO_2$—$Al_2O_3$ solid solution.

Reference Example No. 5

With respect to a predetermined amount of a $ZrO_2$—$Al_2O_3$ solid-solution powder which included $Al_2O_3$ in an amount of 1% by mol, a rhodium nitrate aqueous solution, which had a predetermined concentration, was absorbed in a predetermined amount, was dried at 250° C. for 15 minutes, and was thereafter calcined at 500° C. for 30 minutes to load Rh. The loading amount of Rh was 1% by weight.

While, with respect to a predetermined amount of a γ—$Al_2O_3$ powder, a platinum dinitrodiammine aqueous solution, which had a predetermined concentration, was absorbed in a predetermined amount, was dried at 250° C. for 15 minutes, and was thereafter calcined at 500° C. for 30 minutes to load Pt. The loading amount of Pt was 2% by weight.

50 parts by weight of the Rh/$ZrO_2$—$Al_2O_3$ powder and 100 parts by weight of the Pt/$Al_2O_3$ powder, which were obtained in the aforementioned manner, were mixed, and were further mixed with an alumina sol and water to prepare a slurry. Then, a honey comb substrate (abbreviated as "TP" in the drawing), which had a diameter of 30 mm and a length of 50 mm and which was made from cordierite, was immersed into this slurry, and was thereafter taken up therefrom. An excessive slurry was removed by suction, and the slurry was dried and calcined to form a coating layer. The coating layer was 150 g with respect to 1 L of the honeycomb substrate, and Pt was loaded in an amount of 2 g and Rh was loaded in an amount of 0.5 g with respect to 1 L of the honeycomb substrate.

Then, into the honeycomb substrate with the coating layer formed, a potassium nitrate aqueous solution, which had a predetermined concentration, was absorbed in a predetermined amount, was evaporated, and was dried to solidify. Thereafter, it was dried at 250° C., and was calcined at 500° C. for 30 minutes to load K. The loading amount of K was 0.2 mol with respect to 1 L of the honeycomb substrate.

Comparative Example No. 2

50 parts by weight of a $ZrO_2$—$Al_2O_3$ solid solution powder, which was the same as that of Reference Example No. 5, and 100 parts by weight of a γ—$Al_2O_3$ powder, were mixed, and were further mixed with an alumina sol and water to prepare a slurry. Then, by using this slurry, a coating layer was formed in the same manner as Reference Example No. 5.

Next, into the honeycomb substrate with the coating layer formed, a platinum dinitrodiammine aqueous solution, which hand a predetermined concentration, was absorbed, was evaporated, and was dried to solidify. Thereafter, it was calcined at 300° C. for 15 minutes to load Pt. Subsequently, a rhodiumnitrate aqueous solution, which had a predetermined concentration, was absorbed in a predetermined amount, was evaporated, and was dried to solidify. Thereafter, it was calcined at 300° C. for 15 minutes to load Rh. The respective loading amounts were 2 g for Pt and 0.5 g for Rh with respect to 1 L of the honeycomb substrate.

Thereafter, a potassium nitrate aqueous solution, which had a predetermined concentration, was absorbed in a predetermined amount, was evaporated, and was dried to solidify. Thereafter, it was dried at 250° C., and was calcined at 500° C. for 30 minutes to load K. The loading amount of K was 0.2 mol with respect to 1 L of the honeycomb substrate.

Comparative Example No. 3

With respect to a predetermined amount of a $ZrO_2$—$Al_2O_3$ solid-solution powder, which was the same as that of Reference Example No. 5, a platinum dinitrodiammine aqueous solution, which had a predetermined concentration, was absorbed in a predetermined amount, was dried at 250° C. for 15 minutes, and was thereafter dried at 500° C. for 30 minutes to load Pt. The loading amount of Pt was 2% by weights.

While, with respect to a predetermined amount of a γ—$Al_2O_3$ powder, a rhodium nitrate aqueous solution, which had a predetermined concentration, was absorbed in a predetermined amount, was dried at 250° C. for 15 minutes, and was thereafter calcined at 500° C. for 30 minutes to load Rh. The loading amount of Rh was 1% by weight.

100 parts by weight of the Pt/ZrO$_2$—Al$_2$O$_3$ powder and 50 parts by weight of the Rh/Al$_2$O$_3$ powder, which were obtained in the aforementioned manner, were mixed, and were further mixed with an alumina sol and water to prepare a slurry. Then, by using this slurry, a coating layer was formed in the same manner as Reference Example No. 5. The coating layer was 150 g with respect to 1 L of the honeycomb substrate, and Pt was loaded in an amount of 2 g and Rh was loaded in an amount of 0.5 g with respect to 1 L of the honeycomb substrate.

Then, into the honeycomb substrate with the coating layer formed, a potassium nitrate aqueous solution, which had a predetermined concentration, was absorbed in a predetermined amount, was evaporated, and was dried to solidify. Thereafter, it was dried at 250° C., and was calcined at 500° C. for 30 minutes to load K. The loading amount of K was 0.2 mol with respect to 1 L of the honeycomb substrate.

Comparative Example No. 4

With respect to a predetermined amount of a ZrO$_2$ powder, which was the same as that of Comparative Example No. 1, a rhodium nitrate aqueous solution, which had a predetermined concentration, was absorbed in a predetermined amount, was dried at 250° C. for 15 minutes, and was thereafter calcined at 500° C. for 30 minutes to load Rh. The loading amount of Rh was 1% by weight.

While, with respect to a predetermined amount of a γ—Al$_2$O$_3$ powder, a platinum dinitrodiammine aqueous solution, which had a predetermined concentration, was absorbed in a predetermined amount, was dried at 250° C. for 15 minutes, and was thereafter calcined at 500° C. for 30 minutes to load Pt. The loading amount of Pt was 2% by weight.

50 parts by weight of the Rh/ZrO$_2$ powder and 100 parts by weight of the Pt/Al$_2$O$_3$ powder, which were obtained in the aforementioned manner, were mixed, and were further mixed with an alumina sol and water to prepare a slurry. By using this slurry, a coating layer was formed in the same manner as Reference Example No. 5. The coating layer was 150 g with respect to 1 L of the honeycomb substrate, and Pt was loaded in an amount of 2 g and Rh was loaded in an amount of 0.5 g with respect to 1 L of the honeycomb substrate.

Then, into the honeycomb substrate with the coating layer formed, a potassium nitrate aqueous solution, which had a predetermined concentration, was absorbed in a predetermined amount, was evaporated, and was dried to solidify. Thereafter, it was dried at 250° C., and was calcined at 500° C. for 30 minutes to load K. The loading amount of K was 0.2 mol with respect to 1 L of the honeycomb substrate.

Testing and Evaluation

The respective catalysts of Reference Example No. 5 as well as Comparative Example Nos. 2 through 4 were put in an evaluating apparatus, and a durability test was carried out in which they were held at 550° C. for 3 hours in a fluctuating atmosphere in which the lean/rich model gases set forth in Table 1 were flowed for 4-minute rich model gas and for 1-minute lean gas. The total flow rate of the gases was 30 L/min.

On the respective pellet catalysts after the durability test, the saturated NO$_x$ sorption amounts in a lean atmosphere were measured at the respective temperatures, 300° C., 400° C., 500° C. and 600° C., by using model gases, which were prepared by removing SO$_2$ from the model gases set forth in Table 1, in a fluctuating atmosphere in which the lean/rich model gases were flowed for 4-minute rich model gas and for 1-minute lean gas. The results are illustrated in FIG. 4.

From FIG. 4, it is seen that, compared with the catalysts of Comparative Example Nos. 2 through 4, the catalyst of Reference Example No. 5 exhibited greater saturated NO$_x$ sorption amounts. Since the loading amounts of the respective catalytic components were identical in the catalysts of Reference Example No. 5 as well as Comparative Example Nos. 2 through 4, the differences in the saturated NO$_x$ sorption amounts were resulted from the fact that the loading methods were different.

Namely, in the catalyst of Comparative Example No. 2, the Pt and Rh were loaded on the Al$_2$O$_3$ and ZrO$_2$—Al$_2$O$_3$ solid solution in a uniformly dispersed manner, and, in the catalysts of Comparative Example Nos. 3 and 4, although the Pt and Rh were loaded separately, the Rh was not loaded on the ZrO$_2$—Al$_2$O$_3$ solid solution. On the other hand, in the catalyst of Reference Example No. 5, the Pt was loaded on the Al$_2$O$_3$, the Rh was loaded on the ZrO$_2$—Al$_2$O$_3$ solid solution. Thus, since the Pt and Rh were loaded separately, and, in addition, since hydrogen was generated at the catalytic portions, in which the Rh was loaded on the ZrO$_2$—Al$_2$O$_3$ solid solution, in a rich atmosphere, it is believed that the catalyst of Reference Example No. 5 exhibited an extremely high NO$_x$ sorption ability in post-durability.

Testing Sample

While stirring a zirconium oxynitrate aqueous solution having a concentration of 30% by weight, ammonia water having a concentration of 10% by weight was gradually added so that a molar ratio, Zr: NH$_3$, become 2:3, thereby precipitating zirconia precursors. After filtering and washing the resulting deposits, they were dried at 200° C. for 3 hours, and were calcined at 500° C. for 2 hours, thereby preparing a ZrO$_2$ powder. This ZrO$_2$ powder was mixed into distilled water, while stirring it, a predetermined amount, of an aluminum nitrate aqueous solution having a concentration of 30% by weight was stirred and mixed, and ammonia water having a concentration of 10% by weight was added gradually thereto so that a molar ratio, Al: NH$_3$, become 2:3, thereby precipitating alumina precursors on the surface of the ZrO$_2$ powder. After filtering and washing the resulting deposits, they were dried at 200° C. for 3 hours, and were calcined at 500° C. for 2 hours, thereby preparing a ZrO$_2$—Al$_2$O$_3$ composite oxide powder.

In accordance with the aforementioned manufacturing process, 4 kinds of ZrO$_2$—Al$_2$O$_3$ composite oxide powders were prepared in which a molar ratio, ZrO$_2$:Al$_2$O$_3$, was 99:1, 90:10, 80:20, 70:30 by fed composition.

Figure 5:
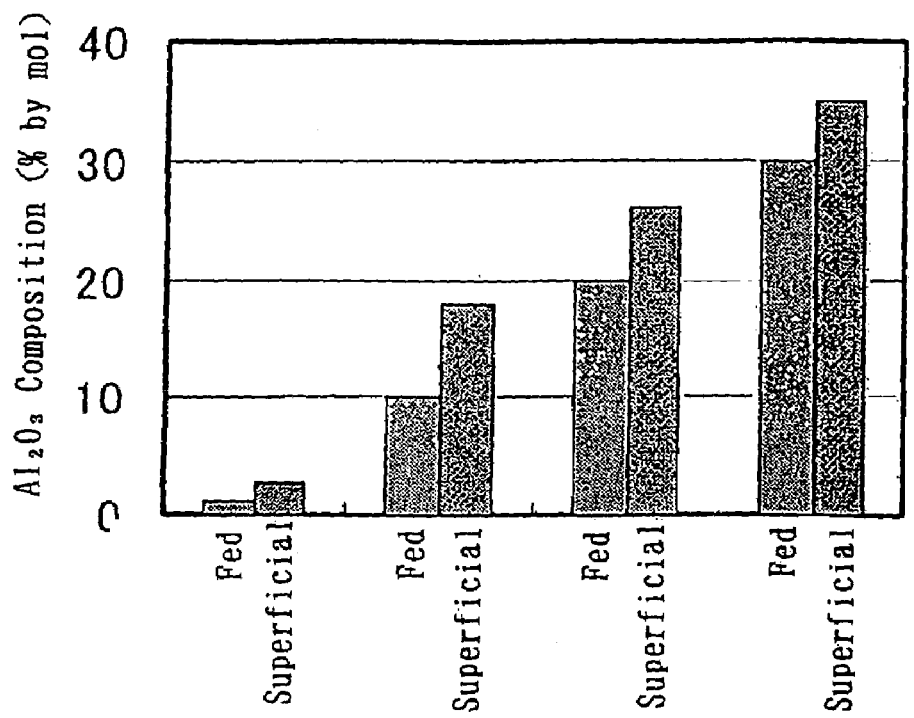
FIG. 5 is a graph for illustrating the fed compositions and superficial compositions of $ZrO_2$—$Al_2O_3$ composite particles which were manufactured in a testing example.

The superficial compositions in the particles of the resulting respective ZrO$_2$—Al$_2$O$_3$ composite oxide powders were found from the XPS peaks by calculation, and the results are illustrated in FIG. 5. In FIG. 5, the fed compositions were illustrated as well. According to XPS, since it is possible to obtain information in a range of from the surface to a few nm's, it is seen that, in the respective ZrO$_2$—Al$_2$O$_3$ composite oxide particles, the Al$_2$O$_3$ compositions in the range of from the surface to a few nm's were greater than the fed values. Namely, in accordance with the aforementioned manufacturing process, it is possible to manufacture first composite particles which have a structure comprising a core portion in which ZrO$_2$ is a major component and a superficial portion formed on a surface of the core portion and including Al$_2$O$_3$ more than the core portion.

Comparative Example No. 5

Into a 50 g of a commercially available $ZrO_2$ powder, a rhodium nitrate aqueous solution, which had a predetermined concentration, was impregnated in a predetermined amount, and was evaporated, and was dried to solidify. Thereafter, it was calcined at 500° C. for 1 hour, thereby preparing an $Rh/ZrO_2$ catalyst powder in which Rh was loaded in an amount of 1% by weight.

While, a predetermined amount of a zirconium oxynitrate aqueous solution having a concentration of 30% by weight and a predetermined amount of a titanium chloride aqueous solution having a concentration of 30% by weight were stirred to mix, and ammonium aqueous solution having a concentration of 10% by weight was gradually added thereto so that a molar ratio, $(Zr+Ti):NH_3$, become 2:3, thereby co-precipitating oxide precursors. After filtering and washing the resulting deposits, they were dried at 200° C. for 3 hours, and were calcined at 500° C. for 2 hours, thereby preparing a $ZrO_2$—$TiO2$ composite oxide powder. This $ZrO_2$—$TiO_2$ composite oxide powder had a uniform composition from the inside to the superficial portion, $ZrO_2$ was 70% by weight, and $TiO_2$ was 30% by weight. Moreover, the average particle diameter was 5 μm.

Subsequently, the total amount of the aforementioned $Rh/ZrO_2$ catalyst powder, 100 g of the $ZrO_2$—$TiO_2$ composite oxide powder and 100 g of an $Al_2O_3$ powder were mixed, and were further mixed with an alumina sol and water to prepare a slurry. Then, a 35-cc honeycomb substrate (abbreviated as "TP" in the drawing) was prepared, was immersed into this slurry, and was thereafter taken up therefrom. An excessive slurry was removed by suction, the slurry was dried at 200° C. for 3 hours, and was thereafter calcined to form a coating layer. The coating layer was 250 g with respect to 1 L of the honeycomb substrate, and Rh was loaded in an amount of 0.5 g with respect to 1 L of the honeycomb substrate.

Then, into the honeycomb substrate with the coating layer formed, a platinum dinitrodiammine aqueous solution, which had a predetermined concentration, was absorbed in a predetermined amount. The loading amount of Pt was 2 g with respect to 1 L of the honeycomb substrate. Moreover, by using a potassium nitrate aqueous solution and barium acetate aqueous solution, which had predetermined concentrations, Ba and K were loaded similarly. The loading amounts of Ba and K were 0.2 mol and 0.15 mol, respectively, with respect to 1 L of the honeycomb substrate.

Comparative Example No. 6

While stirring a zirconium oxynitrate aqueous solution having a concentration of 30% by weight, ammonia water having a concentration of 10% by weight was gradually added so that a molar ratio, $Zr NH_3$, become 2:3, thereby precipitating zirconia precursors. After filtering and washing the resulting deposits, they were dried at 200° C. for 3 hours, and were calcined at 500° C. for 2 hours, thereby preparing a $ZrO_2$ powder. This $ZrO_2$ powder was mixed into distilled water, while stirring it, a titanium chloride aqueous solution having a concentration of 30% by weight was added in a predetermined amount, and thereafter ammonia water having a concentration of 10% by weight was gradually added so that a molar ratio, $Ti:NH_3$, become 2:3, thereby precipitating titania precursors on the surface of the $ZrO_2$ powder. After filtering and washing the resulting deposits, they were dried at 200° C. for 3 hours, and were calcined at 500° C. for 2 hours, thereby preparing a $ZrO_2$—$TiO_2$ composite oxide powder. This $ZrO_2$—$TiO_2$ composite oxide powder had an average particle diameter of 5 μm, and was made into a second composite particle structure, which had a structure comprising a core portion in which $ZrO_2$ was a major component and a superficial portion formed on a surface of the core portion and including $TiO_2$ more than the core portion. The fed compositions were 70% by weight for $ZrO_2$ and 30% by weight for $TiO_2$.

Except that the powder comprising the second composite particles, which had a structure comprising a core portion in which $ZrO_2$ was a major component and a superficial portion formed on a surface of the core portion and including $TiO_2$ more than the core portion, was used instead of the $ZrO_2$—$TiO_2$ composite oxide powder, which was uniform from the inside to the superficial portion, a catalyst of Comparative Example No. 6 was prepared in the same manner as Comparative Example No. 5.

Example No. 1

While stirring a zirconium oxynitrate aqueous solution having a concentration of 30% by weight, ammonia water having a concentration of 10% by weight was gradually added so that a molar ratio, $Zr:NH_3$, become 2:3, thereby precipitating zirconia precursors. After filtering and washing the resulting deposits, they were dried at 200° C. for 3 hours, and were calcined at 500° C. for 2 hours, thereby preparing a $ZrO_2$ powder. This $ZrO_2$ powder was mixed into distilled water, while stirring it, an aluminum nitrate aqueous solution having a concentration of 30% by weight was added in a predetermined amount by stirring, and ammonia water having a concentration of 10% by weight was gradually added thereto so that a molar ratio, $Al:NH_3$, become 2:3, thereby precipitating alumina precursors on the surface of the $ZrO_2$ powder. After filtering and washing the resulting deposits, they were dried at 200° C. for 3 hours, and were calcined at 500° C. for 2 hours, thereby preparing a $ZrO_2$—$Al_2O_3$ composite oxide powder. This $ZrO_2$—$Al_2O_3$ composite oxide powder had an average particle diameter of 5 μm, and was made into a first composite particle structure, which comprised a core portion in which $ZrO_2$ was a major component and a superficial portion formed on a surface of the core portion and including $Al_2O_3$ more than the core portion. The fed compositions were 90% by weight for $ZrO_2$ and 10% by weight for $Al_2O_3$.

Except that the resulting powder comprising the first composite particles, which had a structure comprising a core portion in which $ZrO_2$ was a major component and a superficial portion formed on a surface of the core portion and including $Al_2O_3$ more than the core portion, was used instead of the commercially available $ZrO_2$ powder, an $Rh/ZrO_2$—$Al_2O_3$ catalyst, in which Rh was loaded in an amount of 1% by weight, was prepared in the same manner as Comparative Example No. 5. Then, except that this $Rh/ZrO_2$—$Al_2O_3$ catalyst powder was used instead of the $Rh/ZrO_2$ catalyst powder, a catalyst for purifying an exhaust gas of Comparative Example No. 6 was prepared in the same manner as Example No. 1.

Testing and Evaluation

TABLE 3

| | $H_2$ % | NO ppm | $C_3H_6$ ppmC | $CO_2$ % | CO % | $O_2$ % | $SO_2$ ppm | $N_2$ |
|---|---|---|---|---|---|---|---|---|
| Lean | none | 800 | 930 | 7.3 | none | 10.5 | 100 | balance |
| Rich | 0.89 | none | 2000 | 11.3 | 3.59 | none | 100 | balance |

The respective catalysts of comparative Example Nos. 5 and 6 as well as Example No. 1 were put in an evaluating apparatus, and a durability test was carried out in which they were held at 600° C. for 4 hours in a fluctuating atmosphere in which the lean/rich model gases set forth in Table 3 were flowed for 5-second rich model gas and for 55-second lean gas. The total flow rate of the gases was 30 L/min.

On the respective catalysts after the durability test, by using model gases, which were prepared by removing $SO_2$ from the model gases set forth in Table 1, the rich gas was flowed for 3 seconds in the middle of flowing the lean gas, and the $NO_x$ sorption amounts thereafter (Post-rich Spiking $NO_x$ Sorption Amounts=RS Sorption Amounts) were measured at the respective temperatures between 250 and 500° C. The results are illustrated in FIG. 6.

Figure 6:
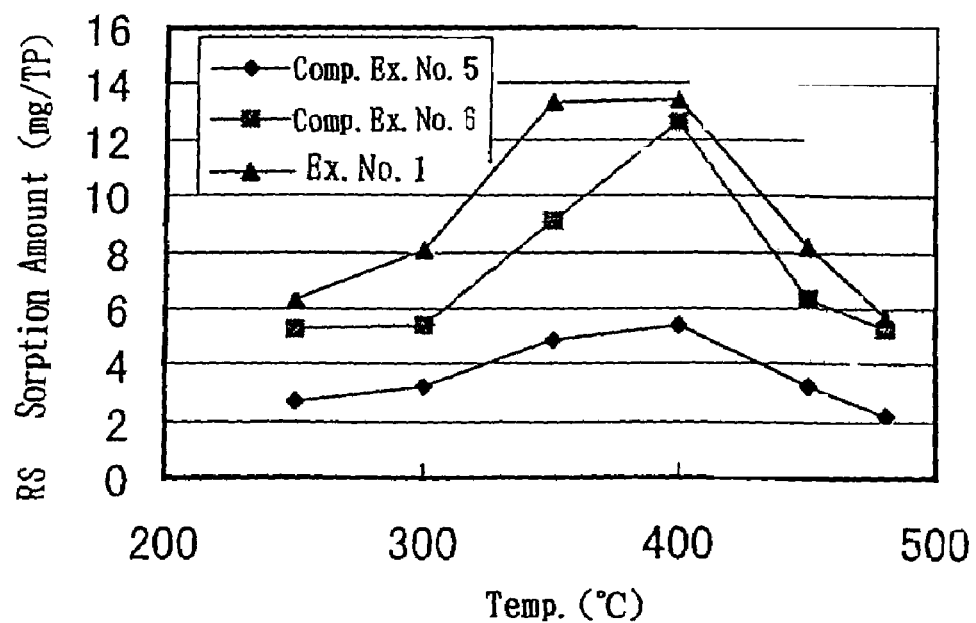
FIG. 6 is a graph for illustrating the relationships between the temperatures and post-rich-spiking $NO_x$ sorption amounts in the catalysts of an example as well as comparative examples.

From FIG. 6, compared with the catalyst of Comparative Example No. 5, the catalyst of Comparative Example No. 6 exhibited higher $NO_x$ sorption amounts at the respective temperatures. It is apparent that this resulted from the fact that the second composite particles, which had a structure comprising a core portion in which $ZrO_2$ was a major component and a superficial portion formed on a surface of the core portion and including $TiO_2$ more than the core portion, was made into the support of the $NO_x$ sorption-and-reduction type catalyst, and is believed that, in the catalyst of Comparative Example No. 6, the sulfur poisoning of the $NO_x$ sorption members was suppressed in the time of the durability test.

Then, compared with the catalyst of Comparative Example No. 6, the catalyst of Example No. 1 exhibited much higher $NO_x$ sorption amounts. It is apparent that this resulted from the fact that Rh was loaded on the first composite particles, which had a structure comprising a core portion in which $ZrO_2$ was a major component and a superficial portion formed on a surface of the core portion and including $Al_2O_3$ more than the core portion, and is believed that it is because the sulfur poisoning of Rh was suppressed in the time of the durability test and because a high hydrogen generating ability was revealed in post-durability as well.

The invention claimed is:

1. A hydrogen generating catalyst comprising Rh loaded on a support,
   said support comprising a $ZrO_2$—$Al_2O_3$ composite oxide comprising first composite particles having a structure comprising a core portion in which $ZrO_2$ is a major component and a superficial portion formed on a surface of the core portion and including $Al_2O_3$ in an amount greater than any amount of $Al_2O_3$ that may be present in the core portion.

2. The hydrogen generating catalyst, as set forth in claim 1, wherein $Al_2O_3$ is included in an amount of from 1 to 30% by mol in said $ZrO_2$—$Al_2O_3$ composite oxide.

3. A $NO_x$ sorption-and-reduction catalyst for purifying an exhaust gas, comprising a noble metal, an $NO_x$ sorption member loaded on a porous oxide support, and the hydrogen generating catalyst as set forth in claim 2.

4. A $NO_x$ sorption-and-reduction catalyst for purifying an exhaust gas, comprising a noble metal, an $NO_x$ sorption member loaded on a porous oxide support, and the hydrogen generating catalyst as set forth in claim 1.

5. The catalyst for purifying an exhaust gas as set forth in claim 4, wherein said porous oxide support includes second composite particles having a structure comprising a core portion in which $ZrO_2$ is a major component and a superficial portion formed on a surface of the core portion and including an oxide, wherein a basicity of the second composite particles is higher in the core portion and is lower in the superficial portion.

6. The catalyst for purifying an exhaust gas as set forth in claim 5, wherein said oxide, having a basicity lower than a basicity of said $ZrO_2$, is $Al_2O_3$, and said second composite particles are a $ZrO_2$—$Al_2O_3$ composite oxide.

7. The catalyst for purifying an exhaust gas as set forth in claim 6, wherein a composition of said second composite particles falls in a range of $Al_2O_3/ZrO_2$=3/97–15/85 by molar ratio.

8. The catalyst for purifying an exhaust gas as set forth in claim 5, wherein said oxide, having a basicity lower than a basicity of said $ZrO_2$, is $TiO_2$, and said second composite particles are a $ZrO_2$—$TiO_2$ composite oxide.

9. The catalyst for purifying an exhaust gas as set forth in claim 8, wherein $TiO_2$ is included in an amount of 30% by weight or more in the superficial portion of said second composite particles.

10. The catalyst for purifying an exhaust gas as set forth in claim 8, wherein said second composite particles further include $Al_2O_3$ in at least one of the core portion and the superficial portion.

11. The catalyst for purifying an exhaust gas as set forth in claim 10, wherein said $Al_2O_3$ is included in an amount of 10% by mol or more in said second composite particles.

12. The catalyst for purifying an exhaust gas as set forth in claim 5, wherein an average particle diameter of said second composite particles is 10 µm or less.

13. The catalyst for purifying an exhaust gas as set forth in claim 4, wherein the catalyst comprises a mixture powder of a powder of the catalyst, in which the noble metal and the $NO_x$ sorption member are loaded on said porous oxide support, and a powder of the hydrogen generating catalyst.

14. The catalyst for purifying an exhaust gas as set forth in claim 4, wherein the catalyst is a powder in which the noble metal and the $NO_x$ sorption member are loaded on a mixture powder comprising a powder of the porous oxide support and a powder of the hydrogen generating catalyst.

* * * * *